(12) United States Patent
O'Neal et al.

(10) Patent No.: US 6,295,355 B1
(45) Date of Patent: Sep. 25, 2001

(54) LEARNED SPEED DIALING

(75) Inventors: Stephen C. O'Neal, San Francisco; Kang S. Lim, Danville, both of CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/282,287

(22) Filed: Mar. 31, 1999

(51) Int. Cl.$^7$ ..................................................... H04M 1/00
(52) U.S. Cl. ........................................... 379/356; 379/354
(58) Field of Search ................................... 379/355, 356, 379/354, 357, 100.14

(56) References Cited

U.S. PATENT DOCUMENTS

| | | | |
|---|---|---|---|
| 4,800,582 | * 1/1989 | D'Agosto, III et al. | 379/216 |
| 4,862,498 | * 8/1989 | Reed | 379/355 |
| 5,034,976 | * 7/1991 | Sato | 379/113 |
| 5,136,637 | * 8/1992 | Rust et al. | 379/356 |
| 5,267,308 | * 11/1993 | Jokinen et al. | 379/354 |
| 5,568,546 | * 10/1996 | Marutiak | 379/355 |
| 5,838,783 | * 11/1998 | Cheng et al. | 379/355 |
| 5,903,634 | * 5/1999 | Wakabayashi et al. | 379/127 |
| 6,005,927 | * 12/1999 | Rahrer et al. | 379/142 |

* cited by examiner

*Primary Examiner*—Wing F. Chan
(74) *Attorney, Agent, or Firm*—Senniger, Powers, Leavitt & Roedel (57) ABSTRACT

A learned speed dial system (LSDS) for use in a telecommunication device monitors the telephone numbers dialed by the user. When the number of times a particular telephone number is used reaches a predetermined threshold, the LSDS determines whether the telephone number is in the speed dial directory. If this telephone number is not in the speed dial directory, the LSDS prompts the user to update the speed dial directory with this telephone number. The user can then elect to update the speed dial directory with this new telephone number, as desired. The learned speed dial system may be configured to automatically add this telephone number to the speed dial directory if the directory is not full. If the speed dial directory is full, the LSDS prompts the user to select a telephone number to delete from the speed dial directory. The LSDS keeps track of the usage of the currently stored speed dial telephone numbers. The LSDS can then automatically select the least-used telephone number in the speed dial directory, which the user can then confirm. Still further, the user may configure the LSDS to automatically replace the least-used telephone number with the "new" telephone number. The LSDS may store deleted telephone numbers in a back-up directory so that the user can correct mistakes in removing a telephone number for the directory. The threshold and criteria can be user configurable.

40 Claims, 5 Drawing Sheets

DIALED NUMBER HISTORY

| TEL. NO. 1 | TIME STAMP 1: MOST RECENT CALL | TIME STAMP 1: NEXT MOST RECENT CALL | ... | TIME STAMP Y: OLDEST STORED CALL |
|---|---|---|---|---|
| TEL. NO. 2 | " | " | ... | " |
| ⋮ | ⋮ | ⋮ | ... | ⋮ |
| TEL. NO. X | " | " | ... | " |

LEARNED SPEED DIALING

CROSS REFERENCE TO RELATED APPLICATIONS

The present Application is related to co-pending U.S. patent application Ser. No. 09/240,368 entitled "Method And Apparatus For Network Independent Initiation of Telephony" and filed Jan. 29, 1999, and is hereby incorporated by reference. The present application is also related to co-pending U.S. patent application Ser. No. 09/283,874 [Attorney Docket No. ITCC113580] entitled "Autocompletion of Dialing Number Based on Prior Usage" filed on Mar. 31, 1999.

FIELD OF THE INVENTION

The present invention relates to telecommunication devices and, more particularly, to telecommunication devices with speed dialing.

BACKGROUND INFORMATION

Some telephonic devices have a feature (referred to herein as "speed dial") that allows the user to store one or more telephone numbers in a memory and then call those numbers using a relatively simple process. For example, speed dial may be performed by pressing a button programmed with the desired stored telephone number, or selecting a desired telephone number (or person to be called) in a graphical user interface (GUI) for a computer-implemented telephonic device. The speed dial feature is generally intended to store frequently used telephone numbers so that the user may more quickly and conveniently dial these frequently used telephone numbers.

Generally, the user must program a speed dial "directory" with the desired telephone numbers. As the user's telephone number usage changes, the user can change the speed dial directory to reflect changes in the telephone numbers that the user most frequently uses. For example, if the user realizes that a new telephone number (i.e., one that is not in the directory) is frequently used, the user can add this telephone number to the speed dial directory. In addition, if the speed dial directory is full, the user must choose which currently stored telephone number to replace with the new telephone number. However, the user may not be able to easily keep track of changes in telephone number usage. Thus, the user may not be able to properly update the speed dial directory so that frequently used numbers can replace relatively infrequently used telephone numbers in the speed dial directory. Accordingly, there is a need for system that allows the user to easily identify changes in telephone number usage and update the speed dial directory.

SUMMARY

In accordance with the present invention, a learned speed dial system for use in a telecommunication device is provided. In one aspect of the present invention, the learned speed dial system monitors the telephone numbers dialed by the user. When the number of times a particular telephone number is used reaches a predetermined threshold, the learned speed dial system then checks to see if the telephone number is in the speed dial directory. If this telephone number is not in the speed dial directory, the learned speed dial system prompts the user to update the speed dial directory with this telephone number. The user can then elect to update the speed dial directory with this new telephone number, as desired. In a further refinement, the learned speed dial system may be configured to automatically add this telephone number to the speed dial directory if the directory is not full.

In another aspect of the present invention, if the speed dial directory is full, the learned speed dial system prompts the user to select a telephone number to delete from the speed dial directory. In a further refinement, the learned speed dial system keeps track of the usage of the currently stored speed dial telephone numbers. The learned speed dial system can then automatically select the least-used telephone number in the speed dial directory, which the user can then confirm. Still further, the user may configure the learned speed dial system to automatically replace the least-used telephone number with the "new" telephone number. In yet a further refinement, the learned speed dial system may store deleted telephone numbers in a back-up directory so that the user can correct mistakes in removing a telephone number for the directory. For embodiments in which the telecommunication device includes a "telephone book" or an "address book", the learned speed dial system can be further configured determine if the deleted telephone number is already stored in the user's telephone or address book before storing the deleted telephone number in the back-up directory. In a further refinement, the learned speed dial system may provide a prompt to the user to add the currently dialed telephone number to the telephone or address book as well as the speed dial directory. In yet a further refinement, the threshold for adding a telephone number to the telephone or address book may be different from the threshold for adding a telephone number to the speed dial directory.

In yet another aspect of the present invention, the user can configure the criteria for the predetermined threshold. Similarly, the user can configure the criteria for the least-used telephone number in the speed dial directory.

BRIEF DESCRIPTION OF THE DRAWINGS

The forgoing aspects and many of the attendant advantages of this invention will become more readily appreciated by reference to the following detailed description, taken in conjunction with the drawings listed below.

DETAILED DESCRIPTION

Figure 1:
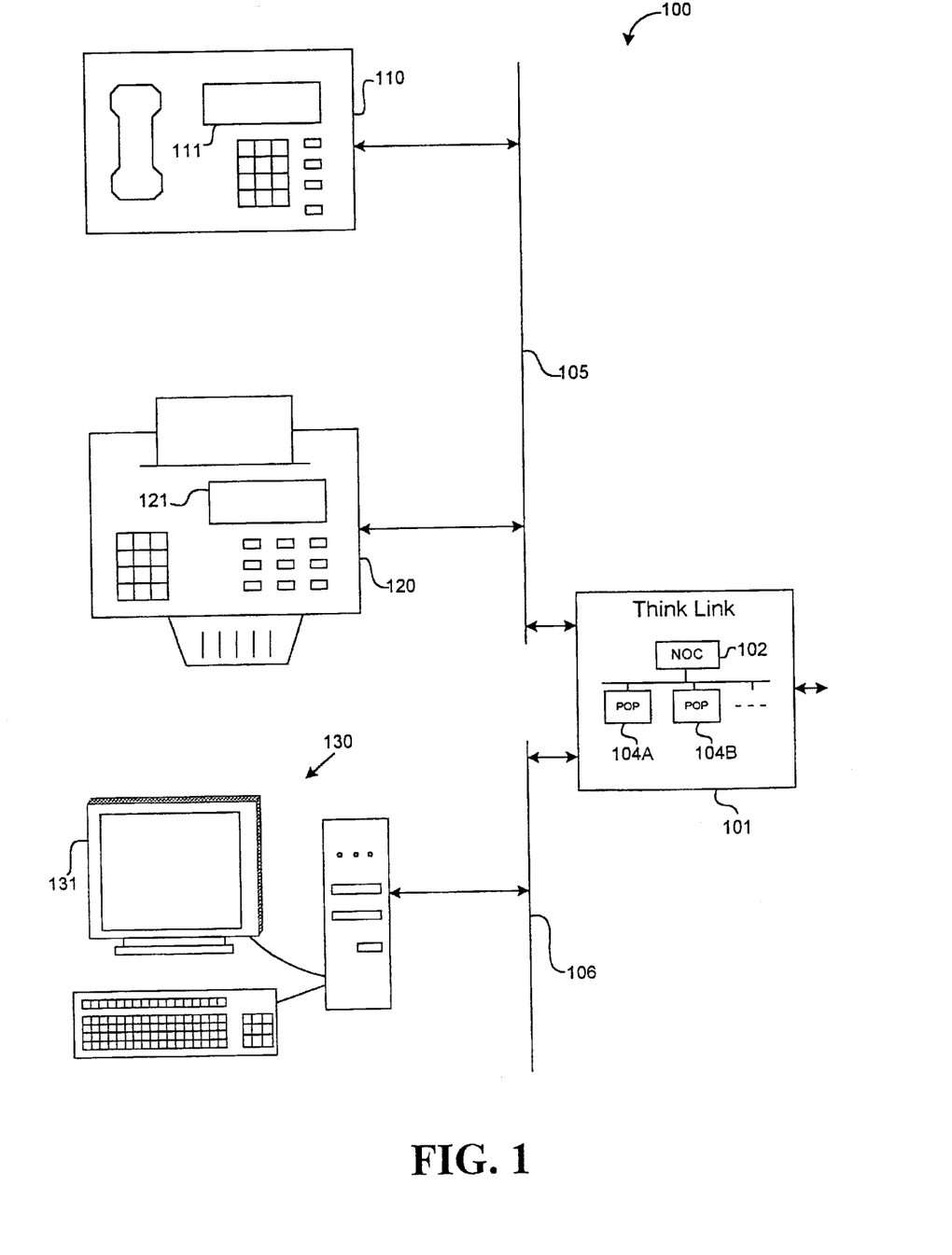
FIG. 1 is a block diagram illustrating telecommunication devices connected to a network independent communication system, in accordance with one embodiment of the present invention.

The present invention is directed toward a speed dial system for use with telecommunication devices. FIG. 1 illustrates a portion of a telephonic communication system 100 having telecommunication devices connected to a network independent communication system 101, in accordance with one embodiment of the present invention. In this embodiment, network independent communication system 101 is implemented with a ThinkLink interface as disclosed in the related U.S. Patent Applications listed above. ThinkLink interface 101 includes a network operations center (NOC) 102 and several points of presence (POPs) 104A, 104B and so on. ThinkLink interface 101 is connected to a telephony-centric network 105 and a data-centric network 106. In one embodiment, the telephony-centric network and the data-centric network are implemented with a public switched telephone network (PSTN) and the Internet, respectively. In addition, telephonic communication system 100 includes a telephone 110 with a display 111, a facsimile machine 120 with display 121 and a computer 130 with display 131. Telephone 110 and facsimile machine 120 are connected to telephony-centric network 105, whereas computer 130 is connected to data-centric network 106. In this embodiment of the present invention, a learned speed dial system is implemented in ThinkLink interface 101, which is described in more detail below. The learned speed dial system is configured to learn which telephone numbers the user frequently uses maintain the speed dial directory so as to track the user's current telephone number usage.

Figure 2:
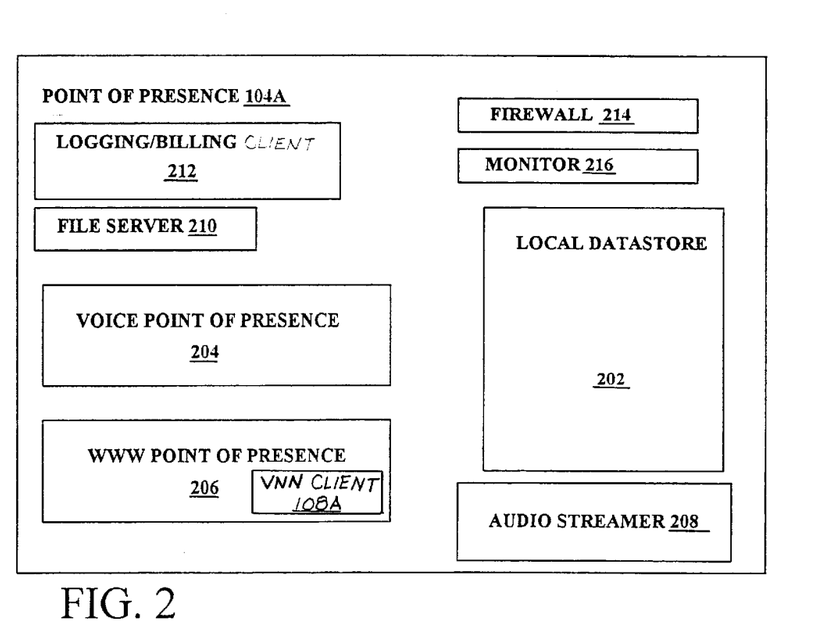
FIG. 2 is a block diagram illustrating a Point of Presence (POP) of the communication system of FIG. 1, in accordance with one embodiment of the present invention.
Figure 3:
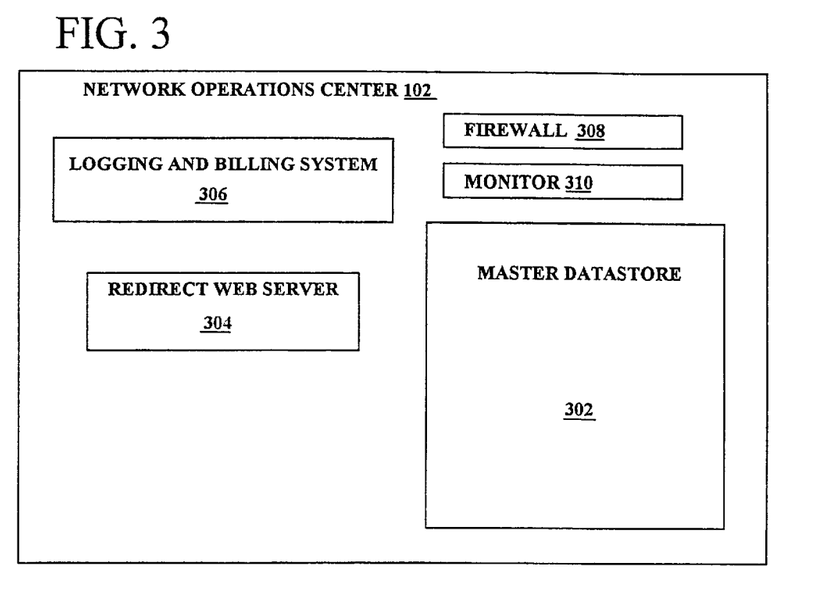
FIG. 3 is a block diagram illustrating a Network Operations Center of the communication system of FIG. 1, in accordance with one embodiment of the present invention.

FIGS. 2 and 3 are block diagrams illustrating an implementation of ThinkLink interface 101. Although only certain aspects of ThinkLink interface 101 are used in one of the embodiments of the present invention, a general description of ThinkLink interface 101 is included facilitate understanding and appreciation of the present invention. In addition, the same reference numbers are used in the FIGURES for elements having the same or similar function or structure.

FIG. 2 illustrates POP 104A (FIG. 1), in accordance with one embodiment of the present invention. Although certain aspects and features of POP 104A are described in the related applications listed above, the following description of POP 104A restates some of these features for clarity, completeness and convenience. POP 104A includes a local database 202 which includes data representing (i) telephonic and data messages, including for example voice mail messages, fax messages, e-mail messages, and page messages, (ii) meta data representing the status of such messages, (iii) a dial number history, and (iv) a speed dial directory or table. Such status of a particular message can include, for example, whether the message has been read, heard, forwarded, or deleted, to which category the message belongs, and for which user the message is intended. Categories of messages are represented to users as folders—a well-known organizational paradigm commonly used in conventional user interfaces. The meta data also represents specific characteristics of various users. Such characteristics can include, for example, a user's name, address, and telephone numbers, and various options which are selected by the user and which affect the particular behavior of communication system 100 with respect to that particular user. Such options can include, for example, whether people leaving messages have the option to page the user, at which telephone number to page the user, whether fax messages are permitted to be received, and whether to alert the user of newly received messages with a page.

The dialed number history is a record of the telephone numbers that the user has previously called. The record corresponding to each telephone number can include information such as the time and date of each call. One implementation of the dialed number history is described below in conjunction with FIG. 6. The speed dial directory or table includes the stored telephone numbers that the user can call by pressing a single button or other simple and convenient manner.

Voice point of presence (VPOP) 204 of POP 104A processes access to POP 104A through PSTN 105 (FIG. 1). VPOP 204 answers telephone calls received through PSTN 105, receives and recognizes user-generated control signals, sends and receives audio signals through PSTN 105, and initiates connections through PSTN 105 by issuing dialing signals thereto. User-generated control signals received and recognized by VPOP 204 can include (i) dual-tone multiple frequency (DTMF) signals generated by the user with end-user telephone equipment, e.g., by pressing of one or more buttons on a touch-tone telephone, and/or (ii) voice commands spoken by the user into the telephone handset.

Internet access to POP 104A is processed by World Wide Web (WWW) point of presence (WPOP) 206. WPOP 206 receives and serves requests for documents according to the hypertext transfer protocol (HTTP) of the WWW of Internet 106. In this illustrative embodiment, a graphical user interface (GUI) is implemented substantially entirely within WPOP 206 as multimedia documents, for example, in hypertext markup language (HTML), active server pages (ASP), and Common Gateway Interface (CGI) scripts and forms. This allows for improvements and enhancements in the GUI and/or behavior of POP 104A as experienced by a user through Internet 106 without any software acquisition or installation by the user. In addition, WPOP 206 implements the simple mail transfer protocol (SMTP) to send and receive e-mail messages through Internet 106. WPOP 206 further includes VVN client 108A to enable telephone-like access through Internet 106 in the manner described in the above-listed "Method And Apparatus For Network Independent Initiation of Telephony" application.

Audio streamer 208 of POP 104A streams audio playback of stored messages for playback through either VPOP 204 and PSIN 105 or WPOP 206 and Internet 106. In one embodiment, audio streamer 208 is the known and conventional RealAudio Player.

POP 104A includes a file server 210 includes a local database or datastore 202 which is accessible to NOC 102

(FIG. 1) through a data-centric network connection. A Firewall 214 ensures that file access requests and illegal requests received through Internet 106 or PSTN 105 are rejected. A logging and billing client 212 tracks outgoing telephone calls placed through VPOP 206 for billing purposes. Logging and Billing client 212 can also be configured to maintain the aforementioned dial number history. A monitor 216 periodically queries components of POP 104A to verify that POP 104A is operating normally. If a particular component of POP 104A becomes inoperative, monitor 216 records the event and notifies a human operator. In addition, monitor 216 can attempt to restart all or part of POP 104A to resume normal operation.

FIG. 3 illustrates NOC 102 (FIG. 1), in accordance with one embodiment of the present invention. Although certain aspects and features of NOC 102 are described in the related applications listed above, the following description of NOC 102 restates some of these features for clarity, completeness and convenience. As illustrated in FIG. 3, NOC 102 includes a master database 302, which in turn includes generally the same type of information described above with respect to local database 202 (FIG. 2). However, master database 302 of NOC 102 replicates data stored in local database 202 (FIG. 2) and analogous local databases of POPs 104B and so on. In one embodiment, NOC 102 retrieves, once per day, the entire contents of local database 202 (FIG. 2) through file server 210 (FIG. 2) and the entire contents of analogous local databases of POPs 104B and so on (FIG. 1). For example, NOC 102 may retrieve the contents of the POP local databases contents during off-peak usage hours such as early morning hours, and stores the contents in master database 302. Alternatively, the contents may be retrieved on an on-going basis throughout the day. In either embodiment, master database 302 provides a backup of contents of local database 202 (FIG. 2).

NOC 102 includes a redirect web server 304. In this embodiment, redirect web server 304 is a web server but is rather limited. In particular, redirect web server 304 responds to requests for a base web page for all initial requests through Internet 106 (FIG. 1) for communication system 100 (FIG. 1). The base web page includes a form by which a user can specify a username and a password. In response to such a request, redirect web server 304 determines, by reference to data stored in master database 302, with which of POPs 104A, 104B and so on (FIG. 1) that the user is associated. For each user of communication system 100 (FIG. 1), a single one of POPs 104A, 104B and so on (FIG. 1) is considered local. Such is true since VPOP 204 (FIG. 2) is accessed through PSTN 105 (FIG. 1) and is preferably accessed through a local, non-toll telephone call. Master database 302 contains data specifying which of POPs 104A, 104B and so on (FIG. 1) is local for each user as identified by a username. By retrieving such data associated with the username entered by the user on the base web page, redirect web server 304 determines which of POPs 104A, 104B and so on (FIG. 1) is local to the user. Redirect web server 304 redirects the user to the WWW point of presence of the local POP, e.g., WPOP 206 (FIG. 2) of POP 104A (FIG. 2), which then receives and serves any additional HTTP requests generated by the user.

NOC 102 further includes a logging and billing system 306 which logs use of communication system 100 (FIG. 1) by each user, which receives usage logs of such users for appurtenant services, e.g., long distance telephone service, and which generates therefrom bills for such usage for each user. In addition, NOC 102 includes a firewall 308 and a monitor 310 that are directly analogous to firewall 214 (FIG. 2) and monitor 216 (FIG. 2), respectively.

Figure 4:
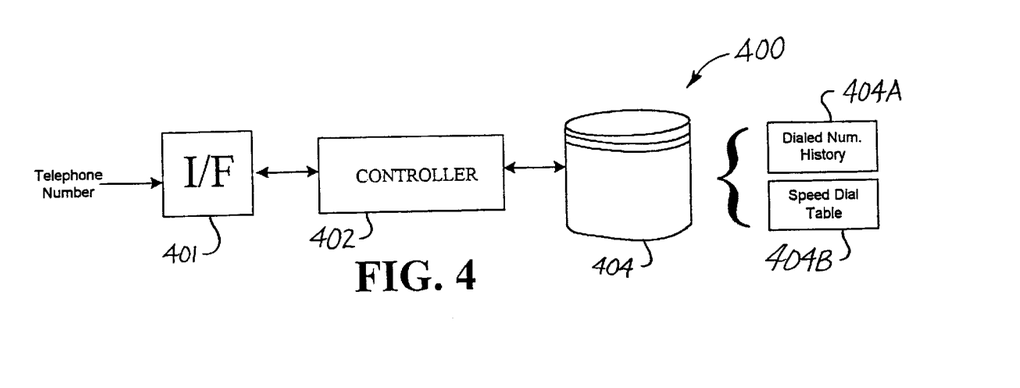
FIG. 4 is a block diagram illustrating a learned speed dialing system, in accordance with one embodiment of the present invention.

FIG. 4 illustrates a learned speed dialing system 400, in accordance with one embodiment of the present invention. Learned speed dialing system 400 includes an interface 401, a controller 402, and a database 404. Database 404 includes a dialed number history 404A and a speed dial table 404B. In general, interface 401 provides a mechanism through which the user can provide and receive data and instructions from controller 402. For example, interface 401 may be implemented using computer 130 (FIG. 1) or the buttons and displays of telephone 110 (FIG. 1) and facsimile machine 120 (FIG. 1). Controller 402 is typically implemented using a processor or control circuit that acts on commands or data provided by the user. For example, controller 402 may be a processor configured to execute a software program stored in a memory (not shown) by which controller 402 responds to commands or data. In addition, controller 402 is configured to access dialed number history 404A and speed dial table 404B of database 404.

For example, learned speed dial system 400 can be implemented on telephone 110 (FIG. 1) or facsimile machine 120 (FIG. 1). In addition, learned speed dial system 400 can be implemented in ThinkLink interface 101 for use with telephony devices that can communicate with ThinkLink interface 101. In this context, communication with ThinkLink interface 101 includes receiving prompts from and sending commands and data to ThinkLink interface 101. As described below in conjunction with FIG. 5, learned speed dial system 400 is configured to learn the telephone numbers frequently called by the user and maintain the speed dial directory accordingly.

Figure 5:
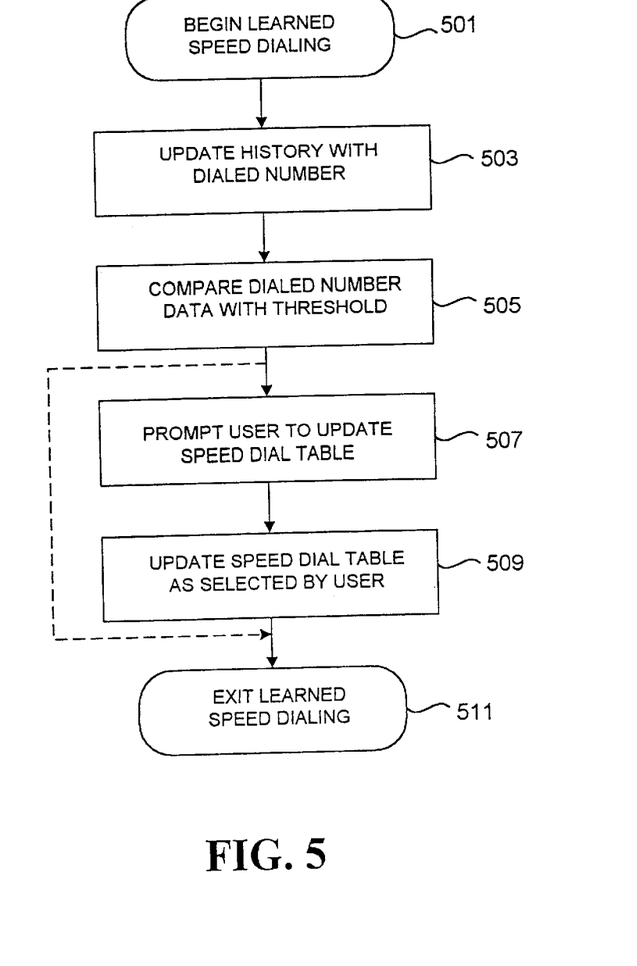
FIG. 5 is a flow diagram illustrating the operation of the learned speed dialing system, in accordance with one embodiment of the present invention.

FIG. 5 illustrates the operation of learned speed dial system 400 (FIG. 4), in accordance with one embodiment of the present invention. Referring to FIGS. 4 and 5, learned speed dial system 400 operates as follows. After the user enters a telephone number to be called through interface 401, the learned speed dialing process begins at a block 501. More specifically, block 501 can begin after the telephone call has ended or after the user enters the telephone number but before the telephone number is actually dialed. The process then proceeds to a block 503 in which controller 402 updates dialed number history 404A with updated information corresponding to the current telephone number. In this embodiment, this information includes the time and date of the present telephone call, which is stored along with similar information for previous calls (if any) to this telephone number. One embodiment of the structure of dialed number history 404A is described below in conjunction with FIG. 6.

The process then proceeds to a block 505 in which controller 402 compares the information corresponding to the current telephone number with a predetermined threshold. This threshold represents criteria used to determine whether the current telephone number should be added to speed dial table 404B. If the updated information for the current telephone number meets the threshold, the process proceeds to a block 507. In block 507, controller 402 then provides a prompt through interface 401 to the user indicating that the user can add the current telephone number to the speed dial table or directory. For embodiments with telephone 110 (FIG. 1) and facsimlle machine 120 (FIG. 1), the prompt is generally in the form of alphanumeric text. For example, the prompt may be the text "WOULD YOU LIKE TO ADD THIS TELEPHONE NUMBER TO SPEED DIAL? PRESS 1 FOR YES OR 2 FOR NO." The prompt may involve several steps to perform the speed dial table update process. For example, there may be other questions asking the user to enter a name for the telephone number. For embodiments with computer 130, a dialog box or series of dialog boxes can be displayed to step the user through the speed dial table update process.

Following block 507, the process proceeds to a block 509 in which controller 402 updates speed dial table 404B as indicated by the user's responses to the prompt. If the user indicates that the current telephone number should be added to speed dial directory, controller 402 accesses database 404 to update speed dial table 404B and the process then proceeds to a block 511. If the user indicates that the current telephone number should not be added to the speed dial directory, the process proceeds directly to block 511. In a further refinement, before proceeding to block 511, controller 402 may provide a prompt asking whether the user would like to be reminded later to enter the telephone number into the speed dial directory. This feature may be advantageously used in embodiments in which the block 501 is performed before the telephone number is actually dialed. In block 511, the learned speed dialing process is exited. Returning to block 505, if the current telephone number does not meet the threshold, the process proceeds directly to step 511 to exit.

In a further refinement of this embodiment, before exiting the process, controller 402 may provide another prompt inquiring whether the user would like to add the current telephone number to a "telephone" or "address" book. This telephone or address book would also be implemented in database 404. Controller 402 would then add or not add the current telephone number to the address or telephone book according to the user's response. In yet a further refinement, the threshold for adding a telephone number to the telephone or address book may be different from the threshold for adding a telephone number to the speed dial directory.

Figure 6:
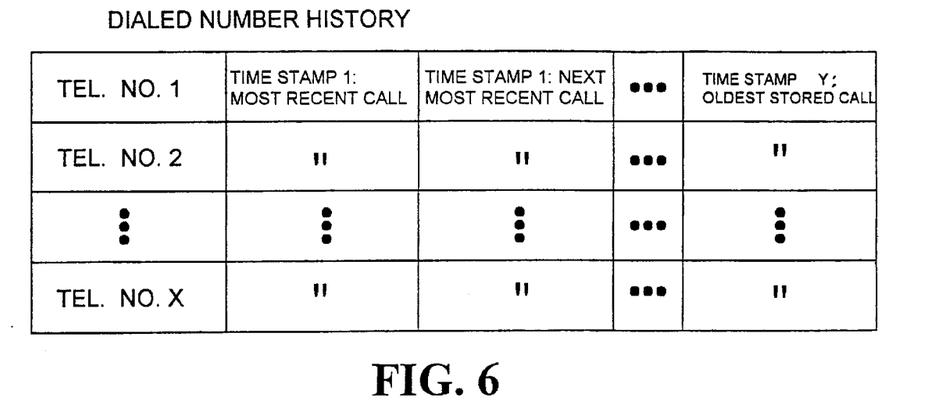
FIG. 6 is a diagram illustrating a dialed number history organization, in accordance with one embodiment of the present invention.

FIG. 6 illustrates one organization of dialed number history 404A (FIG. 4), in accordance with one embodiment of the present invention. In this embodiment, dialed number history 404A includes telephone number entry spaces for a predetermined number of previously dialed telephone numbers. In this embodiment, there are X telephone number entry spaces, as indicated by telephone number 1 through telephone number X in FIG. 6. In addition, for each telephone number entry space, dialed number history 404A includes a predetermined number of call information entry spaces. In this embodiment, there are Y call information entry spaces, as indicated by entry spaces labeled timestamp 1 through timestamp Y in FIG. 6. The predetermined threshold of block 505 (FIG. 5) is defined in terms of information stored in dialed number history 404A. For example, the threshold may be defined as a certain number of calls so that if the total number of filled call information entry spaces is equal to or greater than N (N being between 1 and Y), controller 402 provides the prompt. The timestamps can be used in removing telephone numbers from speed dial history 404A when full. For example, if the history is full when a new telephone number is to be added, controller 402 can be configured to remove the entries for the telephone number having the oldest timestamp 1. Of course, other embodiments may define other criteria based on the timestamps in setting the threshold.

In an alternative embodiment, instead storing the timestamp of each call, the call information entry spaces associated with each telephone number may store the running total of calls made each day, for the last Z days. This data may be used to determine the number of calls made to a telephone number during the last seven days, during the thirty days, during the last sixty days and so on up to Z days. Controller 402 would then update these running totals on a daily basis. The values for X, Y and Z would be optimized for the size of the memory space allotted for dialed number history 404B. These running daily totals may be used to define criteria for establishing the threshold. For example, the criteria can be defined as the number of calls to a particular telephone number in one day, the last seven days, last month, and so on. The threshold may then be set using these criteria. For example, the threshold may be set so that the prompt is provided if the telephone number had been called three times during the day, or six times during the last seven days, or twelve times during the last thirty days. In a further refinement of this embodiment and the previous embodiment, the criteria and thresholds may be configured by the user. This feature may be implemented in an initialization process for learned speed dial system 400. This initialization process may include a series of prompts indicating that the user can configure the criteria and threshold values. In addition, a prompt that allows that user to clear the data for both dialed number history 404A and speed dial table 404B may be included in this initialization process, or be independently accessible.

Figure 7:
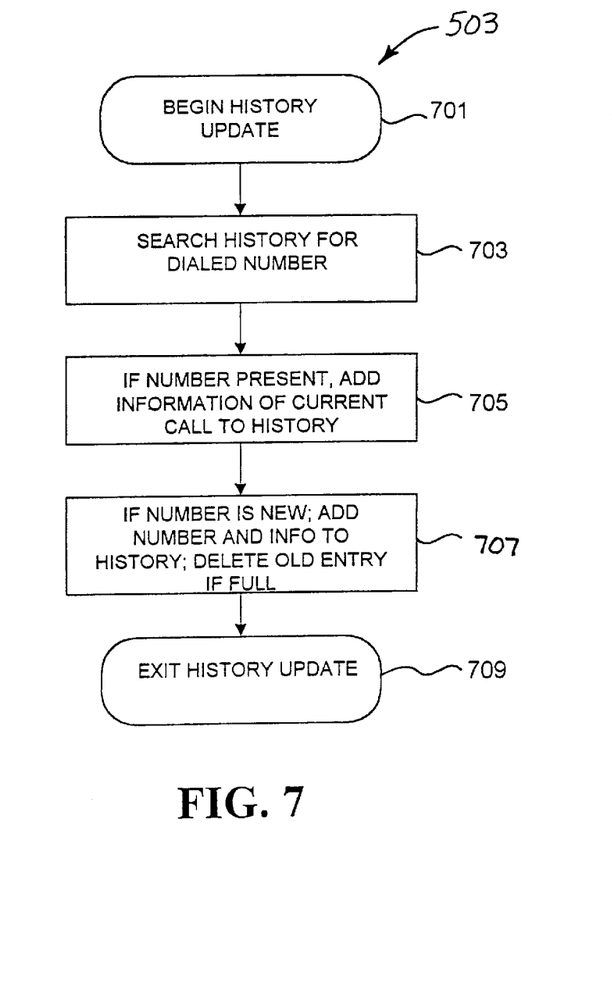
FIG. 7 is a flow diagram illustrating the operation of updating the dialed number history, in accordance with one embodiment of the present invention.

FIG. 7 illustrates in more detail one embodiment of the process of updating dialed number history 404A (FIG. 4). Referring to FIGS. 4 and 7, updating dialed number history 404A is performed as follows. After the user has entered or dialed a telephone number (i.e., the current telephone number in this context), the process begins at a block 701 to update dialed number history 404A. The process proceeds to a block 703 in which controller 402 accesses dialed number history 404A to search the telephone number entries in dialed number history 404A for the current telephone number. Then in a block 705, if controller 402 finds that the telephone number is already stored in dialed number history 404A, controller 402 updates the call information for the corresponding telephone number. As described above, the call information can be, for example, the timestamp of the current telephone call, or the running total of the number of calls made to that telephone on that day. If the call information entry space for that telephone number is full, old call information can be removed first to make space available.

However, if the current telephone number is not already stored in dialed number history 404A, in a block 707, controller 402 determines whether dialed number history 404A is full. If not full, then controller 402 simply adds the current telephone number and its call information to dialed number history 404A. If dialed number history 404A is full, controller 402 removes one of the previously stored telephone numbers and all of its entries. For example, the telephone number selected to be removed can be the telephone number with the fewest call information entries. If more than one telephone number has the fewest call information entries, the telephone number with the fewest entries made within the last seven days can be selected. Those skilled in the art, in light of the present disclosure, will be able to formulate a large number of alternative criteria for selecting the telephone number to remove. The new telephone number is then added to dialed number history 404A. The process then proceeds to a block 709 in which the update history process exits.

Although the embodiment described above has a fixed size for the databases 404A and 404B, it will be appreciated by those skilled in the art that the size of these databases need not be fixed, and would in effect be limited by the size of database 404. Alternatively, the total size of databases 404A and 404B may fixed, but the sizes of the individual databases may vary within the fixed limit.

In a further refinement of the process of FIG. 7, learned speed dial system 400 may be configured to store deleted telephone numbers in a back-up directory (not shown) so that the user can correct mistakes in removing a telephone number from speed dial table 404B. In addition, for embodiments in which the telecommunication device includes a "telephone book" (not shown), learned speed dial system 400 can be further configured determine if the deleted telephone number is already stored in the user's telephone book before storing the deleted telephone number in the back-up directory. As used herein, the telephone book may be implemented using an address book (e.g., the ThinkLink address book of aforementioned "Method And Apparatus For Network Independent Initiation of Telephony" application.

Figure 8:
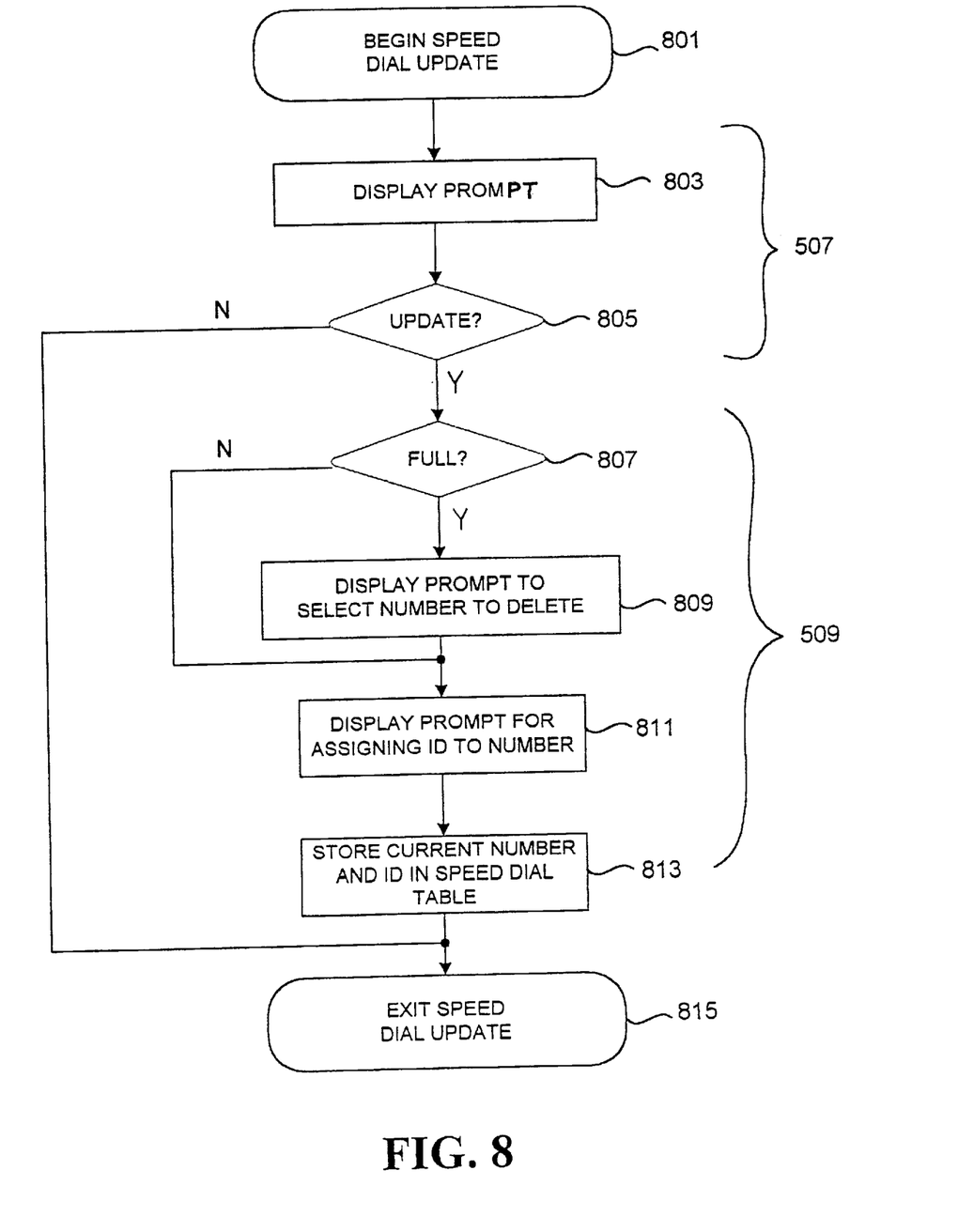
FIG. 8 is a flow diagram illustrating the operations involved in updating the speed dial table, in accordance with one embodiment of the present invention.

FIG. 8 illustrates in more detail one embodiment of the process of updating speed dial table 404B (FIG. 4). Referring to FIGS. 4 and 8, updating speed dial table 404B is performed as follows. The process for updating speed dial table 404B begins at a block 801, after controller 402 has determined that the current telephone number meets the threshold (see block 505 in FIG. 5). The process proceeds to a block 803 in which controller 402 displays via interface 401 a prompt to the user indicating that the user can choose to update the speed dial directory with the current telephone number. As previously described, the prompt may be a series of dialog boxes for embodiments that use ThinkLink 101 (FIG. 1) or a series of alphanumeric text screens formed on the displays for embodiments that use primarily telephonic devices (e.g., the displays of telephone 110 or facsimile machine 120 in FIG. 1).

The process then proceeds to a decision block 805 in which the user responds to the prompt. If the user elects to add the current telephone number to the speed dial directory, the process proceeds to a decision block 807 in which controller 402 determines whether speed dial table 404B is full. If speed dial table 404B is full, the process proceeds to a block 809 in which controller 402, via interface 401, causes a prompt to be displayed to the user indicating that the user must delete a speed dial number currently in the speed dial directory. In one embodiment, this prompt lists all of the speed dial numbers, from which the user can then choose the telephone number to be deleted. In another embodiment, controller 402 suggests a telephone number to be deleted from speed dial table 404B by displaying a relatively infrequently used telephone number, which the user can then accept. For ThinkLink embodiments, the prompt may also allow the user to browse the speed dial directory to select a telephone number to be deleted from speed dial table 404B.

The process then proceeds to a block 811 in which controller 402, via interface 401, causes a prompt to be displayed to the user indicating that the user must assign an ID to the current telephone number for identifying the current telephone number in the speed dial directory. Typically, the user would enter the name of the person or business reached by calling the telephone number. Returning to decision block 807, if speed dial table 404B is not full, the process skips decision block 809 and proceeds directly to block 811.

Then the process proceeds to a block 813 in which controller 402 stores the current telephone number and ID in speed dial table 404B before proceeding to exit the speed dial update process in a block 815. Returning to decision block 805, if the user declines adding the current telephone number to the speed dial directory, the process proceeds directly to block 815 to exit.

The embodiments of the learned speed dialing system described above are illustrative of the principles of the present invention and are not intended to limit the invention to the particular embodiments described. For example, in light of the present disclosure, those skilled in the art can devise without undue experimentation, define different criteria for the threshold and for deleting data stored in the dialed number history and the speed dial directory. Further, other embodiments may implement the prompts differently than the prompts described above. For example, the prompts may include voice or audio signals. Accordingly, while the preferred embodiment of the invention has been illustrated and described, it will be appreciated that various changes can be made therein without departing from the spirit and scope of the invention.

We claim:

1. A method for automatically maintaining a speed dial directory used by a telecommunication device in conjunction with a first database, the first database being configured to store data corresponding to telephone numbers previously dialed with the telecommunication device, the data for each previously dialed telephone number including the telephone number and information corresponding to the previously dialed telephone number, the method comprising:

accessing a first database with data corresponding to a current dialed telephone number;

comparing data of the current dialed telephone number with a predetermined threshold;

updating the first database with data corresponding to the current dialed telephone number; and when the data of the current dialed number meets the predetermined threshold, providing a first prompt to a user, the first prompt indicating that the user can add the current dialed telephone number to the speed dial directory, wherein the predetermined threshold is user-configurable.

2. The method of claim 1 wherein the first database and the speed dial directory reside in the telecommunication device.

3. The method of claim 1 further comprising:

receiving a response to the first prompt;

adding the current dialed telephone number to the speed dial directory when the response to the first prompt indicates that the user desires to add the current dialed telephone number to the speed dial directory; and leaving the speed dial directory unchanged when the response to the first prompt indicates that the user does not desire to add the current dialed number to the speed dial directory.

4. The method of claim 1 further comprising providing a prompt to add the current dialed telephone number to a second database, the second database configured to store data regarding an entity corresponding to the current dialed telephone number.

5. The method of claim 1 further comprising:

determining whether the speed dial directory is full; and when the speed dial directory is full, providing a second prompt to the user, the second prompt indicating that the user can delete a telephone number from the speed dial directory.

6. The method of claim 5 further comprising:

receiving a response to the second prompt; and deleting a telephone number from the speed dial directory when the response to the second prompt indicates a telephone number to be deleted.

7. The method of claim 6 further comprising storing the deleted telephone number and a related name in a back-up directory.

8. The method of claim 7 further comprising determining whether the telephone number deleted from the speed dial directory is stored in a telephone book that is accessible by the telecommunication device.

9. The method of claim 5 wherein providing the second prompt further comprises:

comparing data of the telephone numbers of the speed dial directory with a predetermined deletion rule; and providing in the second prompt the telephone number in the speed dial directory that most closely meets the predetermined deletion rule.

10. The method of claim 9 wherein the predetermined deletion rule is user-configurable.

11. The method of claim 9 wherein the predetermined deletion rule includes selecting the least recently dialed telephone number.

12. The method of claim 9 wherein the predetermined deletion rule includes selecting the least dialed telephone number in the speed dial directory.

13. The method of claim 9 wherein the predetermined deletion rule includes selecting the telephone number least dialed within a selected time period.

14. The method of claim 1 wherein the first database and the speed dial directory reside in a point of presence.

15. The method of claim 14 wherein the telecommunication device includes a computer coupled to a data-centric network.

16. A speed dial system used by a telecommunication device, the system comprising:

a user interface;

a first database configured to store data corresponding to telephone numbers previously dialed using the telecommunication device, the data for each previously dialed telephone number including the telephone number and information corresponding to the previously dialed telephone number;

a speed dial directory; and a controller coupled to the user interface, the first database and the speed dial directory, wherein the controller is configured to update the first database with data corresponding to a current dialed telephone number received at the user interface from a user, wherein the controller is further configured to provide a first prompt to the user via the user interface when the data of the current dialed number meets a predetermined threshold, the first prompt indicating that the user can add the current dialed telephone number to the speed dial directory wherein the predetermined threshold is user-configurable.

17. The system of claim 16 wherein the first database and the speed dial directory reside in a point of presence.

18. The system of claim 17 wherein the telecommunication device includes a computer coupled to a data-centric network.

19. The system of claim 16 wherein the first database and the speed dial directory reside in the telecommunication device.

20. The system of claim 16 wherein the controller is further configured to selectively add the current dialed telephone number to the speed dial directory according to the user's response to the first prompt.

21. The system of claim 16 wherein the controller is further configured to cause the user interface to provide a prompt to the user to add the current dialed telephone number to a second database, the second database being configured to store data regarding an entity corresponding to the current dialed telephone number.

22. The system of claim 16 wherein the controller is further configured to provide a second prompt via the user interface when the speed dial directory is full, the second prompt indicating that the user can delete a telephone number from the speed dial directory.

23. The system of claim 22 wherein the controller is further configured to selectively delete a telephone number from the speed dial directory according to the user's response to the second prompt.

24. The system of claim 23 wherein the controller is further configured to store the deleted telephone number in a back-up directory.

25. The system of claim 24 wherein the controller is further configured to determine whether the telephone number deleted from the speed dial directory is stored in a telephone book that is accessible by the telecommunication device, the deleted telephone number not being stored in the back-up directory when the telephone number is stored in the telephone book.

26. The system of claim 22 wherein, in providing the second prompt, the controller is further configured to provide in the second prompt the telephone number in the speed dial directory that most closely meets a predetermined deletion rule.

27. The system of claim 26 wherein the predetermined deletion rule is user-configurable.

28. The system of claim 26 wherein the predetermined deletion rule includes selecting the least recently dialed telephone number.

29. The system of claim 26 wherein the predetermined deletion rule includes selecting the least dialed telephone number in the speed dial directory.

30. The system of claim 26 wherein the predetermined deletion rule includes selecting the telephone number least dialed within a selected time period.

31. An apparatus for maintaining a speed dial directory used by a telecommunication device, the apparatus comprising:

means for accessing a first database, the first database being configured to store data corresponding to telephone numbers previously dialed using the telecommunication device, the data for each previously dialed telephone number including the telephone number and information corresponding to the previously dialed telephone number;

means for comparing data of the current dialed number with a predetermined threshold;

means for updating the first database with data corresponding to a current dialed telephone number; and means for providing a first prompt to a user when the data of the current dialed number meets the predetermined threshold, the first prompt indicating that the user can add only the current dialed telephone number to the speed dial directory and wherein the first prompt is not provided when the data of the current dialed number does not meet the predetermined threshold.

32. The apparatus of claim 31 further comprising means for providing a second prompt to the user when the speed dial directory is full, the second prompt indicating that the user can delete a telephone number from the speed dial directory.

33. The apparatus of claim 32 further comprising means for selectively deleting a telephone number from the speed dial directory according to the user's response to the second prompt.

34. The apparatus of claim 33 wherein the means for selectively deleting is further configured to store the deleted telephone number in a back-up directory.

35. The apparatus of claim 34 wherein the means for selectively deleting is further configured to determine whether the telephone number deleted from the speed dial directory is stored in a telephone book that is accessible by the telecommunication device, the deleted telephone number not being stored in the back-up directory when the telephone number is stored in the telephone book.

36. The apparatus of claim 32 wherein, in providing the second prompt, the controller is further configured to provide in the second prompt the telephone number in the speed dial directory that most closely meets a predetermined deletion rule.

37. The apparatus of claim 31 further comprising means for selectively updating the speed dial directory with the currently dialed telephone number according to the user's response to the first prompt.

38. The apparatus of claim 31 wherein the telecommunication device includes a computer coupled to a data-centric network.

39. The apparatus of claim 31 wherein the first database and the speed dial directory reside in the telecommunication device.

40. The apparatus of claim 31 further comprising means for providing a prompt to the user to add the current dialed telephone number to a second database, the second database being configured to store data regarding an entity corresponding to the current dialed telephone number.

* * * * *